United States Patent [19]

Gallucci et al.

[11] Patent Number: 5,385,970
[45] Date of Patent: Jan. 31, 1995

[54] HALOGEN-FREE FLAME RETARDANT TERNARY BLENDS

[75] Inventors: Robert R. Gallucci, Mt. Vernon, Ind.; Ping Y. Liu, Naperville, Ill.

[73] Assignee: General Electric Company, Pittsfield, Mass.

[21] Appl. No.: 100,658

[22] Filed: Jul. 30, 1993

[51] Int. Cl.$^6$ ............................................. C08L 51/00
[52] U.S. Cl. ..................... 524/538; 525/431; 525/446
[58] Field of Search ................. 525/431, 446; 524/538

[56] References Cited

U.S. PATENT DOCUMENTS

| | | |
|---|---|---|
| 4,141,927 | 2/1979 | White et al. |
| 4,450,266 | 5/1984 | Idel et al. |
| 4,472,565 | 9/1984 | Ryang ................................. 525/431 |
| 4,689,365 | 8/1987 | Chacko et al. |
| 4,816,527 | 3/1989 | Rock . |
| 4,820,781 | 4/1989 | Policastro ........................... 525/431 |

FOREIGN PATENT DOCUMENTS

| | | |
|---|---|---|
| 021506 | 2/1981 | Japan . |
| 63-077965 | 4/1988 | Japan . |
| 63-077965A | 4/1988 | Japan . |

*Primary Examiner*—Melvyn I. Marquis

[57] ABSTRACT

This invention is directed to a non-halogen flame retardant thermoplastic molding composition having in combination a high molecular weight linear polyester and a non-halogen flame retardant. The flame retardant may be either a copolymer of polyetherimide-organopolysiloxane or a blend thereof with a polyphenylene sulfide, and/or a polyetherimide. The molding composition of the invention may also contain a filler.

11 Claims, No Drawings

HALOGEN-FREE FLAME RETARDANT TERNARY BLENDS

FIELD OF THE INVENTION

This invention relates of an improved flame retardant thermoplastic molding composition that is halogen-free and yet maintains its physical properties upon molding thereof. More particularly, the improved flame retardant composition of this invention is a composition of a high molecular weight polyester and a flame retardant amount of a polyetherimide-organopolysiloxane copolymer and, optionally, may contain in combination therewith polyphenylene sulfides and/or polyetherimides, and fillers. The molding composition of this invention finds use in such applications as molded articles, coatings such as wire jacketing, extruded tubing, extruded profiles, film and sheet, etc.

BACKGROUND OF THE INVENTION

The particular individual polymer components of this invention are known polymers, as well as the fillers, and are described in the literature. For example U.S. Pat. No. 4,816,527 is a polymer blend of a polycarbonate and a siloxane-polyetherimide copolymer and is incorporated herein by reference with respect to the copolymer of the siloxane-polyetherimide. U.S. Pat. No. 4,141,927 discloses blends of polyetherimides and high molecular weight polyesters particularly polybutylene terephthalate.

Japanese patent publication JP 021506 discloses thermoplastic polyester composition of a reinforcing forcing agent, a polyphenylene sulfide and a polyester such as polybutylene terephthalate or polyethylene terephthalate.

Japanese patent publication JP 63077965-A discloses a flame resistant polyethylene terephthalate and a polyphenylene sulfide resin containing brominated polystyrene and a filler. The brominated polystyrene is the flame retardant additive.

U.S. Pat. No. 4,689,365 discloses a fiber reinforced polybutylene terephthalate molding composition blended with a polyphenylene sulfide to improve resistance to the vapour phase soldering process.

U.S. Pat. No. 4,450,266 discloses a composition of siloxane compounds as stabilizers for parapolyphenylene sulfides and mixtures with thermoplastic polycarbonates, polyesters and polyestercarbonates.

Brominated flame retardants, which are well known in the art, have been particularly successful as flame retardant additives. However, because of the concern of the impact that bromine and other halogens might have on the environment, there is a definite need for alternative non-halogen flame retardant systems. In addition, such halogen containing compounds generate corrosive by products during processing or when exposed to fire which can result in damage to sensitive parts or micro chips, such as in a computer.

SUMMARY OF THE INVENTION

In accordance with the present invention, the improved flame retardant thermoplastic composition herein is a non-halogenated flame retardant thermoplastic composition comprising in combination a high molecular weight linear polyester having an intrinsic viscosity (IV) of at least about 0.4 deciliters per gram (dl/g) as measured in a 60:40 phenol tetrachorethane mixture at 30° C. and a flame retardant amount of a polyetherimide-organopolysiloxane copolymer flame retardant. The composition of this invention may also have in combination therewith polyphenyline sulfides, and/or polyetherimides and a filler. More specifically, the composition of this invention comprises about 85 to 40 parts by weight of a high molecular weight polyester and about 60 to 15 parts by weight of a polyetherimide-organopolysiloxane copolymer. Optionally, the composition may also comprise, in addition thereto, about 1 to 25 parts by weight of a polyphenylene sulfide, 5 to 20 parts by weight of a polyetherimide and about 10 to 40 parts by weight of a filler which may be a reinforcing or a non-reinforcing filler. The parts by weight are based on the total weight of the composition of the polyester, the copolymer and/or the other optional additives.

DETAILED DESCRIPTION OF THE INVENTION

In accordance with this invention, there is provided an improved flame retarded thermoplastic molding composition comprising in combination a high molecular weight linear polyester resin and a flame retardant amount of a flame retardant of a polyetherimide-organopolysiloxane copolymer and, optionally, in combination therewith, a polyphenylene sulfide, a polyetherimide and/or a filler.

The high molecular weight polyesters employed in the practice of the present invention are derived from an aliphatic or cycloalyphatic diol or mixtures thereof, containing 2 or more carbon atoms and at least one aromatic dicarboxylic acid. The polyesters which are utilized herein are available commercially or can be prepared by known techniques, such as by the alcoholysis of esters of the phthalic acid or combination of phthalic acids with an aliphatic diol and subsequent polymerization, by heating the diol with the free acids or with halide derivatives thereof, and similar processes. These are described in U.S. Pat. Nos. 2,465,319 and 3,047,539, and elsewhere.

One class of preferred polyesters employed in the practice of this invention will be of the family consisting of high molecular weight, polymeric aliphatic terephthalates and/or isophthalates having repeating units of the general formula:

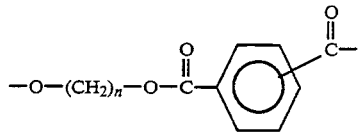

wherein n is a whole number of from two to four, and mixtures of such esters, including copolyesters of terephthalic and isophthalic acids of up to about 30 mole percent of isophthalic units.

Especially preferred polyesters are poly(ethylene terephthalate) and poly(1,4-butylene terephthalate).

Illustratively, high molecular weight polyesters will have an intrinsic viscosity of at least about 0.4 deciliters/gram and, preferably, at least about 0.7 deciliters/gram as measured in a 60:40 phenol tetrachlorethane mixture at 30° C. At intrinsic viscosities of at least about 1.1 deciliters/gram, there is a further enhancement in toughness of the present compositions.

Also included within the scope of the present invention with respect to the high molecular weight linear polyesters are combinations of polybutylene terephthalates and polyethylene terephthalates. The combinations may be blends thereof, or blends of copolymers of polybutylene terephthalate and polyethylene terephthalate with homopolymers of polybutylene terephthalate and homopolymers of polyethylene terephthalate, or copolymers of the two polyesters. The preferred combination is a blend of polybutylene terephthalate and polyethylene terephthalate. Although during extrusion of the blend of the two polyesters, some copolymer may be formed, probably in the range of about 5 weight percent range. Normally, a phosphorous stabilizer is added, particularly a phosphite, in order to inhibit the formation of the copolymer of polybutylene terephthalate and the polyethylene terephthalate. In the blends thereof, the composition will generally consist essentially of about 30 to 70 and preferably 40 to 60 parts by weight of the polybutylene terephthalate and correspondingly about 30 to 70 parts and preferably about 60 to 40 parts by weight of the polyethylene terephthalate, the parts by weight being based on the total weight of the polybutylene terephthalate and polyethylene terephthalate.

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to and above about 50 carbon atoms, and which is the decarboxylated residue derived from an aromatic dicarboxylic acid.

Examples of aromatic dicarboxylic acids indicated by $R_{10}$ in the formula above include isophthalic or terephthalic acid, 1,2-di(p-carboxyphenyl)ethane, 4,4′-dicarboxydiphenyl ether, etc., and mixtures of these. All of these acids contain at least one aromatic nucleus. Fused rings can also be present such as in 1,4 or 1,5 naphthalenedicarboxylic acids. The preferred dicarboxylic acid is terephthalic acid or mixtures of terephthalic and isophthalic acid.

A preferred polyester may be derived from the reaction of either the cis- or trans-isomer (or a mixture thereof) of 1,4-cyclohexanedimethanol with a mixture of iso- and terephthalic acids. These polyesters have repeating units of the formula:

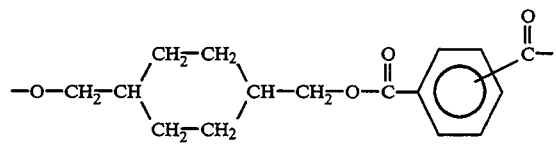

Another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

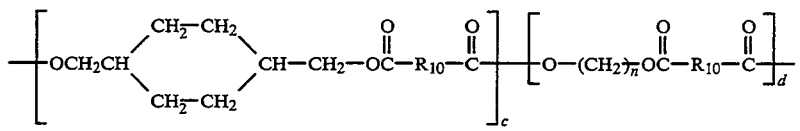

including cycloaliphatic straight and branched chain acids, such as adipic acid, cyclohexanediacetic acid, dimerized $C_{16}$–$C_{18}$ unsaturated acids (which have 32 to 36 carbon atoms), trimerized acids, and the like.

Another preferred class of polyesters employed in the present invention are derived from a cycloaliphatic diol and an aromatic dicarboxylic acid prepared by condensing either the cis- or trans-isomer (or mixtures thereof) of, for example, 1,4-cyclohexanedimethanol with the aromatic dicarboxylic acid so as to produce a polyester having recurring units having the following formula:

wherein the 1,4-cyclohexanedimethanol is selected from the cis- and trans-isomers thereof, $R_{10}$ is a previously defined, n is an integer of 2 to 4, the c units comprise from about 10 to about 90 percent by weight, and the d units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in, for example, a molar ratio of 1:2:3. These copolyester have repeating units of the following formula:

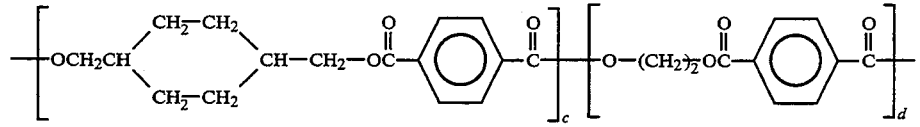

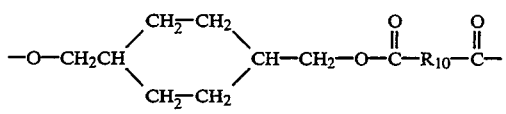

wherein the 1,4-cyclohexane dimethanol is selected from the cis- and trans-isomers thereof and $R_{10}$ represents an aryl radical containing 6 to 20 carbon atoms wherein c and d are as previously defined.

The polyesters as described herein are either commercially available or can be produced by methods well known in the art such as those set forth in, for example, U.S. Pat. No. 2,901,466.

The preferred cycloaliphatic polyesters are poly(1,4-cyclohexanedimethanol tere/iso-phthalate) and a copolyester of 1,4-cyclohexanedimethanol, ethylene glycol and terephthalic acid and poly(ethylene terephthalate) as previously described.

The polyesters used herein have an intrinsic viscosity of at least about 0.4 and may be as high as about 2.0 dl/g. measured in a 60:40 phenol/tetrachloroethane mixture of similar solvent at 23°–30° C.

The polyetherimide-organopolysiloxane copolymers employed in this invention consist essentially of repeating units of the formula:

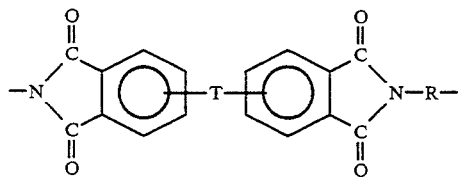

and repeating units of the formula:

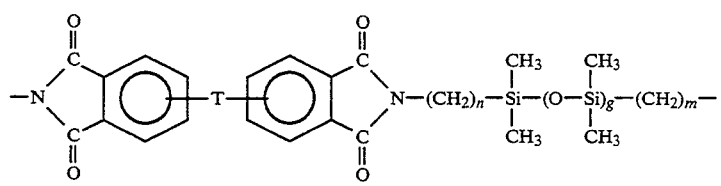

wherein T is

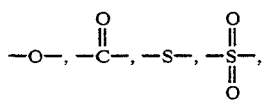

or a group of the formula:

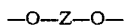

wherein the diva lent bonds of the

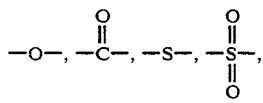

or the —O—Z—O— group are in the 3, 3′, 3, 4′, 4,3′ or 4, 4′ positions; Z is a member of the class consisting of (A):

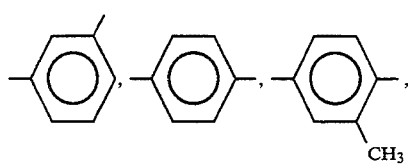

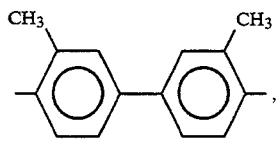

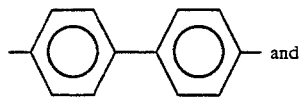 and

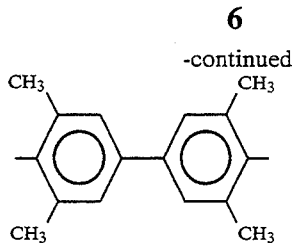

or (B) divalent organic radicals of the general formula:

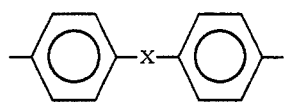

where X is a member selected from the group consisting of divalent radicals of the formulae:

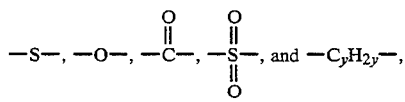

where y is an integer from 1 to about 12; and R is a divalent organic radical selected from the group consisting of (a) aromatic hydrocarbon radicals having from 6 to about 20 carbon atoms and derivatives thereof, (b) alkylene radicals having from 2 to about 20 carbon atoms, cycloalkylene radicals having from 3 to about 20 carbon atoms, and (c) divalent radicals of the general formula:

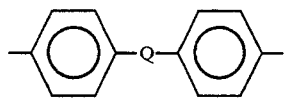

where Q is a member selected from the group consisting of:

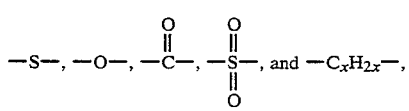

x is an integer from 1 to about 12; n and m independently are integers from 1 to about 10, and g is an integer from 1 to about 100. In preferred polysiloxane-polyetherimide copolymers, n and m independently are integers from 1 to about 5, and g is an integer from 5 to about 25, most preferable from about 9 to about 20.

The polyetherimide-organopolysiloxane copolymer may be a block copolymer, a random copolymer or an alternating copolymer. The organosiloxane-containing repeating units advantageously constitute from about 20 to about 50 mole %, preferable from about 25 to about 40 mole %, of the polyetherimide-organopolysiloxane copolymer.

The polyetherimide-organopolysiloxane copolymers can be prepared by well-known polyetherimide-producing processes. In general, the copolymers are prepared by reacting an aromatic bis(ether anhydride) of the formula:

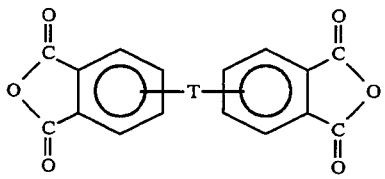

with an organic diamine of the formula:

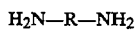

an amine-terminated organopolysiloxane of the formula:

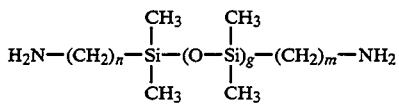

wherein T, R, n, m, and g are as defined above.

In one embodiment, the polyetherimide repeating units may, in addition to the etherimide repeating units described above, further contain polyimide repeating units of the formula:

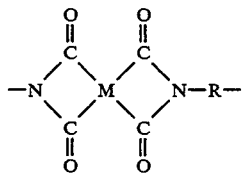

wherein R is defined as above, and M is selected from the group consisting of:

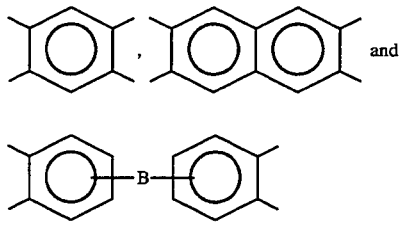

where B is —S— or —CO—. Polyetherimides containing such groups are described by Williams et al. in U.S. Pat. No. 3,983,093, incorporated herein by reference.

Bis(ether anhydride)s which may be used for preparing siloxane-polyetherimide copolymers include, for example:

1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride; and
4,4'-bis(phthalic anhydride) ether.

A preferred class of aromatic bis(ether anhydride)s includes compounds of formulas (I), (II) and (III), which follow:

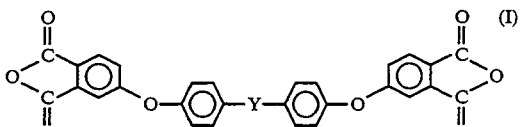

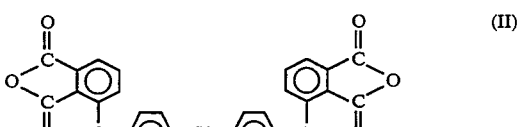

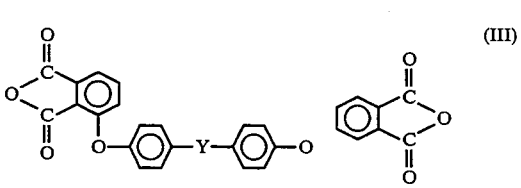

and mixture thereof, where Y is selected from the group consisting of —O—, —S—, —CO—, —C(CH$_3$)$_2$— and —SO$_2$. Aromatic Bis(ether anhydride)s of formula (I) include, for example:

2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenylsulfone dianhydride; and mixtures thereof.

Aromatic bis(ether anhydride)s of formula (II) include, for example:

2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenylsulfone dianhydride; and mixtures thereof.

Aromatic bis(ether anhydride)s of formula (III) may be, for example:

4-(2,3-dicarboxyphenoxy)-4'-(3,4-dicarboxyphenoxy)diphenyl-2,2-propane dianhydride;
4-(2,3-dicarboxyphenoxy)-4'-(3,4-dicarboxyphenoxy)diphenyl ether dianhydride;
4-(2,3-dicarboxyphenoxy)-4'-(3,4-dicarboxyphenoxy)diphenyl sulfide dianhydride;
4-(2,3-dicarboxyphenoxy)-4'-(3,4-dicarboxyphenoxy)benzophenone dianhydride;
4-(2,3-dicarboxyphenoxy)-4'-(3,4-dicarboxyphenoxy)diphenylsulfone dianhydride; and mixtures thereof.

Examples of organic diamines which may be employed in preparing the polyetherimide-organopolysiloxane include:
m-phenylenediamine;
p-phenylenediamine;

4,4'-diaminodiphenylpropane;
4,4'-diaminodiphenylmethane (commonly named 4,4'-methylenedianiline);
4,4'-diaminodiphenyl sulfide;
r,r'-diaminodiphenyl sulfone;
4,4'-diaminodiphenyl ether (commonly named 4,4'-oxydianiline);
1,5-diaminonaphthalene;
3,3-dimethylbenzidine;
3,3-dimethoxybenzidine;
2,4-bis(beta-amino-t-butyl)toluene;
bis(p-beta-amino-t-butylphenyl) ether;
bis(p-beta-methyl-o-aminophenyl) benzene;
1,3-diamino-4-isopropylbenzene;
1,2-bis(3-aminopropoxy)ethane; benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecandiamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine; and mixtures of such diamines.

The organic diamine and the amine-terminated organopolysiloxane may be mixed prior to reaction with the bis(ether anhydride)(s), thus forming a substantially random copolymer. Alternatively, block or alternating copolymers may be formed by first preparing prepolymers or by sequential addition of reactants, as is well known in the polymer arts. In addition, it is contemplated that closely related polyetherimide-organopolysiloxane block copolymers may be formed by end functionalizing etherimide oligomers and organosiloxane oligomers and reacting such end-functionalized oligomers together. The blends of the present invention are intended to encompass blends of such block copolymers, although they might differ from the foregoing formulas slightly in the linkages between the polyorganosiloxane groups and the etherimide groups.

Numerous procedures are useful for preparing the polyetherimide-organopolysiloxane copolymers. A presently preferred procedure is described in U.S. Pat. No. 4,417,044, which is incorporated herein by reference.

The amount of the copolymer employed herein is that amount sufficient to flame retard the high molecular weight linear polyester and preferably ranges from 15 to about 60 parts by weight and correspondingly 85 to 40 parts by weight of the polyester.

In the practice of this invention, the improved flame retardant thermoplastic molding composition may also have in combination therewith a polyphenylene sulfide.

The polyphenylene sulfide enhances the flame retardant properties of the composition set forth herein.

Any of the commercially available polyphenylene sulfide (hereinafter PPS) powders can be employed in the practice of this invention. A particularly preferred PPS is known as Supec ® and is sold by General Electric Company, Pittsfield, Mass. Another PPS that can be employed herein is known as Ryton V-1 and is sold by Philips Petroleum, Bartlesville, Okla.

The PPS polymers that can be employed in this invention can be linear, branched or lightly crosslinked. Suitable PPS polymers can be produced, for example, by the methods of Edmonds, et. al., in U.S. Pat. No. 3,354,129 and Campbell in U.S. Pat. No. 3,919,177. If desired, such polymers can be subjected to mild, partial curing or light crosslinking, as in the method of Rohlfing, U.S. Pat. No. 3,717,620, prior to being used in the compositions of the invention. The polymers will generally have crystalline melting points ranging from about 200° C. to about 480° C. A presently preferred PPS polymer has a crystalline melting point ranging from about 250° C. to 300° C. Preferred PPS polymers have an inherent viscosity in 1-chloronaphthalene at 206° C. and a polymer concentration of 0.4 g/100 ml solution ranging from about 0.1 to 0.6.

The PPS polymers used in the present invention is a polymer comprising at least 70 molar %, preferable at least 90 molar %, of recurring units of the structural formula:

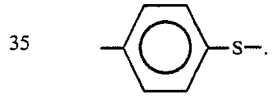

When the amount of said recurring units is less than 70 molar %, the heat resistance is insufficient.

PPS polymers include generally those having a relatively low molecular weight prepared by, for example, a process disclosed in the specification of U.S. Pat. No. 3,354,129 and essentially linear polymers having a relatively high molecular weight prepared by, for example, a process disclosed in the specification of U.S. Pat. No. 3,919,177. The degree of polymerization of the polymers prepared by the process of U.S. Pat. No. 3,354,129 can be further increased by heating the same in an oxygen atmosphere or in the presence of a crosslinking agent such as a peroxide after the polymerization. Though PPS polymers prepared by any process can be used in the present invention, an essentially linear polymer having a relatively high molecular weight prepared by the process of said U.S. Pat. No. 3,919,177 is preferably employed herein.

Thirty (30) molar % or less of the recurring units of PPS can be those of the structural formulae:

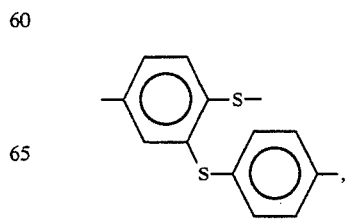

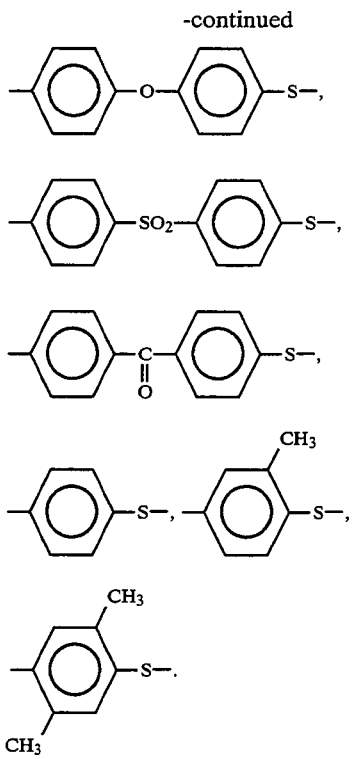

Though the melt viscosity of PPS polymers employed in the present invention is not particularly limited providing moldings can be obtained, a melt viscosity of at least 100 poise is preferred from the viewpoint of the toughness of PPS polymers per se and that of 10,000 poise less is preferred from the viewpoint of the moldability.

It is known that PPS polymers can be "cured" by heating in contact with an oxygen-containing gas (usually air) at temperatures above about 200° C., resulting in a substantial decrease in melt flow and, apparently, a concomitant increase in molecular weight. While the exact nature of the curing reaction is not known, it appears to involve branching and/or chain extension, which probably occurs thermally or by oxidation of some type. The PPS polymers employed in this invention are preferably cured before using in preparing the composition of this invention. Typical curing conditions are in the solid or liquid state at temperatures in the range of about 250° C. to 350° C., for time periods of about 2-10 hours.

The amount of PPS that may be employed herein is that amount with the copolymer of polyetherimides-organopolysiloxane sufficient to flame retard the polyester and is preferably 1 to about 25 parts by weight based on the weight of the thermoplastic molding composition.

The polyetherimide resin that may be optionally included in the present invention further enhances the flame retardant properties of the improved flame retardant molding composition of this invention. The polyetherimide resins are well known resins and are commercially available from General Electric Company, Pittsfield, Massachusetts and are sold under the trademark ULTEM ® resin. The polyetherimide that may be utilized herein include polyetherimides of the formula:

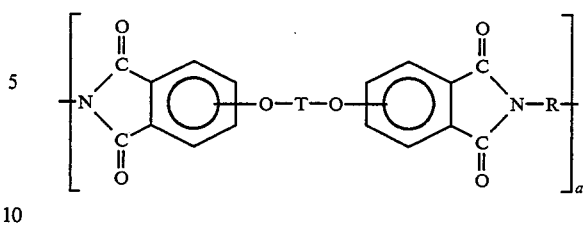

where $a$ represents a whole number in excess of 1, e.g., 10 to 10,000 or more. The polyetherimides are as previously described under the polyetherimides portion of the polyetherimide-organopolysiloxane but do not, obviously, include the organopolysiloxane portion thereof with R and T having the same meaning as previous. The polyetherimides that can also be employed in the practice of this invention are the copolymers thereof other than copolymers with organopolysiloxanes. Such copolymers of polyetherimides are copolymers prepared from various dianhydrides and various diamines or mixtures of various dianhydrides and mixtures of various diamines.

Polyetherimides can be obtained by any of the methods well known to those skilled in the art, including the reaction of any aromatic bis(ether anhydrides) with an organic diamine, both of which are previously described herein with respect to the polyetherimide-organopolysiloxane copolymer.

In general, the reactions for preparing the polyetherimide can be advantageously carried out employing well-known solvents, e.g., o-dichlorobenzene, m-cresol/toluene, N-methyl-pyrrolidone, etc., in which to effect interaction between the dianhydrides and the diamines, at temperatures of from about 100° to 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine and dianhydride are employed for high molecular weight polyetherimides, however, in certain instances, a slight molar excess (about 1 to 5 mol percent) of diamine can be employed resulting in the production of polyetherimides having terminal amine groups. Monofunctional organic amines such as aniline, or organic anhydrides such as phthalic anhydride and maleic anhydride provide molecular weight control. Low molecular weight polyetherimide can be employed to form copolymers. From 0.1 to 50 mole percent of comonomers based on the total moles of reactants can be employed. Generally, useful polyetherimides have an intrinsic viscosity [n] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al, 3,847,867, Williams 3,847,869, Takekoshi et al, 3,850,885, White 3,852,242 and 3,855,178, etc. These disclosures are incorporated herein in their entirety by reference for the purpose of teaching, by way of illustration, general and specific methods for preparing polyetherimides suitable for the blends of this invention.

The amount of polyetherimide employed herein is that amount with the copolymer of polyetherimide-organopolysiloxane and with or without the polyphenylene sulfide sufficient to flame retard the polyester and is preferably about 5 to about 20 parts by weight thereof based on the weight of the thermoplastic molding composition.

The compositions of the present invention also optionally include either reinforcing or non-reinforcing fillers or combinations thereof. The fillers that can be included in the present invention are glass fibers, other inorganic fillers such as clay, talc, milled glass, wollastonite, mica, carbon, fibers, silicates, etc., or combinations thereof. The preferred filler is the glass fiber reinforcing filler. The amount of filler employed herein may range from about 15 to about 40 parts by weight based on the weight of the thermoplastic molding composition.

The compositions of the present invention are prepared in conventional ways. For example, in one way, the ingredients are put into an extrusion compounder with the polyester resin to produce molding pellets. The polyetherimide-organopolysiloxane copolymer is dispersed in a matrix of the polyester resin in the process. The other ingredients can also be mixed with powdered or granulated polyester resin and directly molded, e.g. by injection or transfer molding techniques. It is always important to free the polyester resin from as much moisture as possible before molding of the composition.

In addition, compounding of the composition should be carried out to ensure that the residence time in the machine is short, the temperature is carefully controlled, the friction heat is utilized, and an intimate blend of the ingredients is obtained.

Although it is not essential, best results are obtained if the ingredients are pre-compounded, pelletized and then molded. Pre-compounding can be carried out in conventional equipment. For example, after carefully pre-drying the composition of this invention, e.g. at about 125° for about 4 hours, a single screw extruder is fed with a dry blend of all of the ingredients, the screw employed having a long transition and metering section to ensure melting. On the other hand, a twin screw extrusion machine, e.g. a 30 mm Werner Pfleiderer extruder can be fed with resin and additives at the feed point. In another case, a generally suitable machine temperature will be about 400° to 570° F.

The pre-compounded composition can be extruded and cut up into molding compounds such as conventional granules, pellets, etc., by standard techniques.

The compositions of this invention can be molded in any equipment conventionally used by thermoplastic compositions. For example, with poly(1,4-butyleneterephthalate), good results will be obtained in an injection molding machine, e.g., of the Newbury type with conventional cylinder temperature, e.g., 500° F. and conventional mold temperatures, e.g., 150° F.

The present invention provides a non-halogen flame retardant thermoplastic molding composition comprising a high molecular weight linear polyester and a flame retardant in an amount sufficient to render the polyester flame retardant. The flame retardant may be either the polyetherimide-organopolysiloxane copolymer or the combination thereof with the polyphenylene sulfide, and/or the polyetherimide and the fiber reinforcing agent. The amount of the copolymer flame retardant should be preferably at least 15 parts by weight based on the weight of the polyester and flame retardant, and more particularly at least about 30 parts by weight. The greater the amount, the better the flame resistance.

On the other hand, by adding the other additives of this invention, the amount of copolymer needed can be decreased to achieve comparable flame resistance. The amount of the various flame retardant additives of this invention are within the choice of those skilled in the art and can be based on the economics of the system or the flame resistance wanted and/or the application for the thermoplastic composition of this invention.

In order for those skilled in the art may better understand how to practice the present invention, the following examples are given by way of illustration and not by way of limitation.

Examples 1–5

The following formulations were mechanically blended, extruded, pelletized, and dried at about 120° C. for 2 hours. The pellets were then molded into test specimens using an 80 ton Van Dorn injection molding machine. The temperature of the barrel of the injection molding machine was about 500° F. flat profile and the mold temperature was about 170° F. The test specimens were about $\frac{1}{2}$" wide by 5" long, having a thickness of either 1/16" or $\frac{1}{8}$" as shown in Table 1. The samples were tested for flame resistance in accordance with Underwriters Laboratory Bulletin 94.

Impact strength was also tested in accordance with ASTM procedure D256, Notched Izod. Separate test bars were molded under the same conditions as above and were $\frac{1}{8}$" thick by $\frac{1}{2}$" wide by about $2\frac{1}{2}$" long. The formulations and the results obtained are set forth in Table 1.

TABLE 1

| Example | Control 1 | 2 | 3 | 4 | 5 |
|---|---|---|---|---|---|
| Ingredients (parts by wt.) | | | | | |
| PBT | 100.00 | 85.00 | 70.00 | 59.85 | 50.00 |
| PEI/S | | 14.85 | 29.65 | 40.00 | 49.85 |
| Stabilizer | 0.15 | 0.15 | 0.15 | 0.15 | 0.15 |
| Properties | | | | | |
| UL Bul 94 | | | | | |
| at 1/8" bar | B | V-2 | V-2 | V-1 | V-0 |
| 1/16" bar | B | | | V-2 | V-1/V-0 |
| Notched Izod ft-lbs/inch | 1.0 | 0.9 | 1.5 | — | — |

PBT - polybutylene terephthalate, VALOX ® 315 by General Electric Company IV about 1.25 dl/g
PEI/S - polyetherimide - orangopolysiloxane copolymer, SILTEM ® by General Electric Company
B - burns
Stabilizer - Irganox 1076, a hindered phenol by Ciba Geigy Co.

Examples 6–7

Examples 1–5 were repeated except that the following formulations were prepared with the addition of fibrous glass reinforcement and the results obtained were as follows:

| Ingredients (parts by wt.) | Control Example 6 | Example 7 |
|---|---|---|
| PBT | 69.85 | 40.0 |
| PEI/S | 0 | 29.25 |
| Glass Fibers | 30.00 | 30.00 |

-continued

| Ingredients (parts by wt.) | Control Example 6 | Example 7 |
|---|---|---|
| Stabilizer | 0.15[1] | 0.35[2] |
| UL Bul. 95 | | |
| 1/8" bar | HB | V-0 |
| 1/16" bar | HB | V-0 |
| Notched Izod ft-lbs/inch | 1.6 | 2.5 |

PBT and PEI/S were the same as in Table 1
HB - horizontal burns
[1] same as Table 1.
[2] 0.15 parts of Inganox 1076 and 0.20 parts of a barium phosphite mixture Ferro AM595 by Ferro Corporation

Examples 8–12

Examples 1–5 were repeated employing, however, the formulations as set forth in the following Table 2, along with the results obtained.

TABLE 2

| Example | 8 | 9 | 10 | 11 | 12 |
|---|---|---|---|---|---|
| Ingredients (parts by wt.) | | | | | |
| PBT | 70.00 | 70.00 | 70.00 | 66.65 | 50.00 |
| PEI/S | 27.85 | 26.65 | 24.85 | 30.00 | 24.85 |
| PPS | 2.00 | 3.00 | 5.00 | 3.00 | 25.00 |
| Stabilizer | 0.15[1] | 0.35[2] | 0.15[1] | 0.35[2] | 0.15[1] |
| Properites | V-1 | V-1 | V-1 | V-2 | V-1 |
| U. Bul 94 at 1.8" bar | | | | | |
| Notched Ized ft-lbs/inch | 1.1 | — | 0.8 | 0.8 | |

PBT and PEI/S - same as in Table 1
PPS - polyphenylene sulfide, SUPEC ® S-161 by General Electric Company
[1] and [2] same as in Examples 6 and 7

Examples 13–17

Examples 8–12 were repeated employing, however, the formulations as set forth in Table 3 with glass fibers, along with the results obtained.

TABLE 3

| Examples | 13 | 14 | 15 | 16 | 17 |
|---|---|---|---|---|---|
| Ingredients (parts by wt.) | | | | | |
| PBT | 47.85 | 37.65 | 38.65 | 32.65 | 37.65 |
| PEI/S | 20.00 | 30.00 | 30.00 | 35.00 | 20.00 |
| PPS | 2.00 | 2.00 | 1.00 | 2.00 | 2.00 |
| Stabilizer | 0.15[1] | 0.35[2] | 0.15[1] | 0.35[2] | 0.15[1] |
| Glass Fibers | 30.00 | 30.00 | 30.00 | 30.00 | 40.00 |
| Properties | | | | | |
| U. Bul 94 at 1/8" bar | V-1/V-2 | V-0 | V-0 | V-0 | V-2 |
| AT 1/16" bar | V-2 | V-2 | V-2 | V-0 | |
| Notched Izod ft-lbs/inch | 2.1 | 2.4 | 2.4 | 2.7 | 3.7 |

PBT, PEI/S and PPS - same as used in Tables 1 and 2
[1] and [2] same as used in Examples 6 and 7

Examples 18–19

Examples 1–5 were repeated employing, however, the following formulations with the following results.

| Ingredients (parts by wt.) | Example 12 | Example 19 |
|---|---|---|
| PBT | 69.85 | 69.85 |
| PEI/S | 25.00 | 20.00 |
| PEI | 5.00 | 10.00 |
| Stabilizer | 0.15[1] | 0.15[1] |
| UL Bul 94 | | |
| 1/4" bar | V-1 | V-2 |
| Notched Izod ft.-lbs/inch | 1.0 | 0.9 |

PEI - Polyetherimide, ULTEM ® 1010 by General Electric Company
PBT and PEI/S - same as set forth in Table 1
[1] same as used in Table 1

Examples 20–21

Examples 1–5 were repeated employing, however, the following formulations with the following results:

| Ingredients (parts by wt.) | Example 20 | Example 21 |
|---|---|---|
| PCT | 70.00 | 10.10 |
| PBT | 0 | 27.65 |
| PEI/S | 26.85 | 30.00 |
| PPS | 3.00 | 2.00 |
| Glass Fibers | 0 | 30.00 |
| Stabilizer | 0.15[1] | 0.35[2] |
| UL Bul 94 | | |
| 1/8" bar | — | V-0 |
| 1/16" bar | V-2 | V-1 |
| Notched Izod ft.-lbs/inch | 12.8 | 2.9 |

PCT - EKTAR 3879, Eastman Chemical Co., inherent viscosity of 0.77, a poly(1,4-cyclohexanedimethanol) terephthalate
PBT, PEI/S and PPS - same as in Table 1 and 2
[1] and [2] - same as in Examples 6 and 7

While other modifications and variations of the present invention are possible in light of the above teachings, it is therefore understood that changes may be made in the particular embodiments described herein without deviating from the scope of this invention as defined in the appended claims.

What is claimed is:

1. An improved flame retardant thermoplastic molding composition comprising in combination a high molecular weight linear polyester and a flame retardant amount of a copolymer of polyetherimide and an organopolysiloxane wherein the polyester has an intrinsic viscosity of at least about 0.4 deciliters per gram as measured in a 60:40 phenol tetrachloroethane mixture at 30° C. and is selected from the group consisting of polybutylene terephthalate, polyethylene terephthalate, polypropylene terephthalate, blends thereof and copolymers thereof.

2. The composition of claim 1 wherein the composition comprises about 85 to about 40 parts by weight of the high molecular weight polyester and 15 to about 60 parts by weight of the flame retardant.

3. The composition of claim 1 wherein the flame retardant thermoplastic composition consists essentially of a high molecular weight polybutylene terephthalate and a flame retarding amount of the copolymer of polyetherimide and organopolysiloxane.

4. The composition of claim 3 where in the composition consists essentially of 85 to about 40 parts by weight of the polybutylene terephthalate and 60 to about 15 parts by weight of the flame retardant copolymer of polyetherimide and organopolysiloxane.

5. The improved flame retardant thermoplastic molding composition of claim 1 having in addition thereto an additive selected from the group consisting essentially of polyetherimides, polyphenylene sulfides and a filler.

6. The composition of claim 5 wherein the additive is polyetherimide in an amount of 5 to about 20 parts by weight based on the total weight of the polyester, the copolymer of polyetherimide and organopolysiloxane and the polyetherimide additive.

7. The composition of claim 5 wherein the additive is polyphenylene sulfide in an amount of 1 to about 25 parts by weight based on the total weight of the polyester, the copolymer of polyetherimide and organopolysiloxane and the polyphenylene sulfide.

8. The composition of claim 5 wherein the composition has 10–40 parts by weight of a filler.

9. The composition of claim 8 wherein the filler is reinforcing glass fibers.

10. The composition of claim 5 wherein the molding composition consists essentially of (1) 80–40 parts by weight of a high molecular weight linear polyester having an intrinsic viscosity of at least about 0.4 deciliters per gram as measured in a 60:40 phenol tetrachloroethane mixture at 30° C., (2) 20–60 parts by weight of a copolymer of polyetherimide and organopolysiloxane, and (3) 1–25 parts by weight of a polyphenylene sulfide, parts by weight being based on the total weight of (1), (2) and (3).

11. The composition of claim 5 consisting essentially of (a) 85 to 40 parts by weight of the polyester, (b) 20 to 35 parts by weight of the copolymer of polyetherimide and organopolysiloxane, (c) 1 to 25 parts by weight of polyphenylene sulfide, (d) 5 to 15 parts by weight of polyetherimide, and (e) 10 to 40 parts by weight of glass fiber reinforcing filler, the parts by weight being based on the total weight of (a), (b), (c), (d), and (e).

* * * * *